D. White, Jr.,
Turning Regular Forms.

Nº 19,395.        Patented Feb. 16, 1858.

Witnesses:
Benj. Robinson
Wilson W. Carey

Inventor:
Daniel White Jr.

UNITED STATES PATENT OFFICE.

DANIEL WHITE, JR., OF LOWELL, MASSACHUSETTS.

REST ATTACHMENT FOR LATHES.

Specification of Letters Patent No. 19,395, dated February 16, 1858.

*To all whom it may concern:*

Be it known that I, DANIEL WHITE, Jr., of Lowell, in the county of Middlesex and State of Massachusetts, have invented a new and Improved Mode of Wood-Turning; and I do hereby declare that the following is a full and lucid description thereof, reference being had to the accompanying drawing and to the letters of reference marked thereon.

The nature of my invention consists, first, in the application of a backrest for wood turning in such a manner as to prevent the piece that is being turned from springing or flying out; secondly, the construction and application of a hand molding tool in such a manner as shall transfer with despatch a facsimile of any molding to the piece that is being turned; thirdly, the application of an index so constructed and arranged that any number of pieces may be turned exactly corresponding to the index and molding tool.

To enable others skilled in the art to make and use my invention I will proceed to describe my mode of construction and operation.

Figure 1:
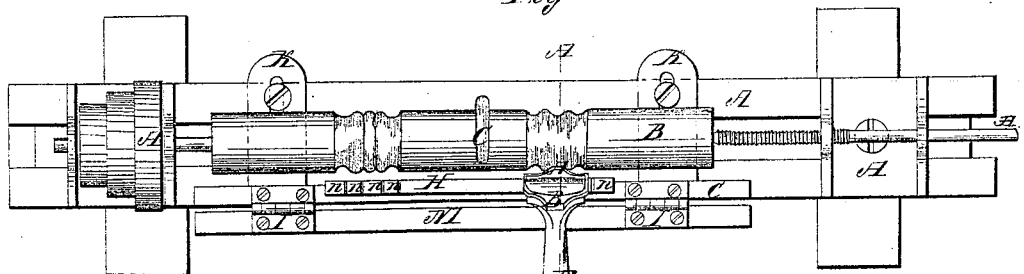
Figure 2:
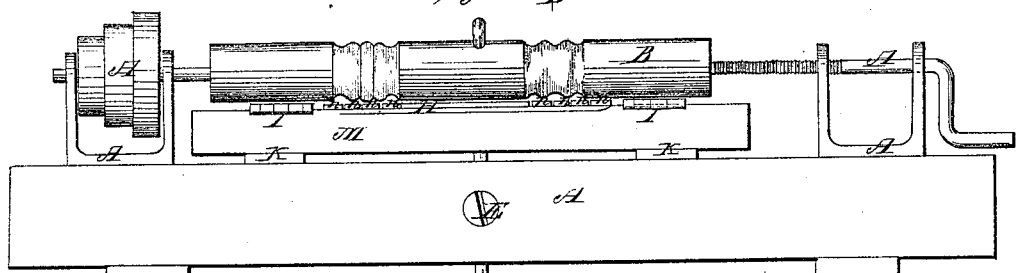
Figure 3:
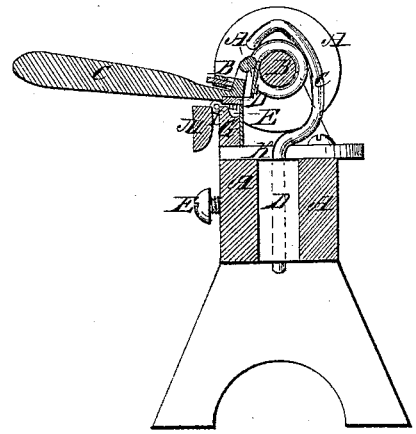

Figure 1, is a plan, Fig. 2 a side elevation, and Fig. 3, a transverse vertical section through A, B, plainly showing all the parts, which are separately indicated by alphabetical letters as follows;

A, denotes the lathe; B, a piece of wood to be turned; C, the back rest, and D the stand which holds it; E, a thumb screw by which the rest C is confined in any desired position.

F, denotes the molding tool the parts of which are represented by, A, the cutting iron; B, a looped bolt or strap which confines it to the stock C; D, an adjustable plate fitted to the index H, and confined to the tool stock by the bolt E.

G, is an index rest hinged at I, and so constructed that the upper part denoted by M, serves as a rest to rough out and prepare the wood for the molding tool after which it is turned down to expose the index.

n, n, n, n, K, K, are stands which confine rest G, to the bed piece of the lathe.

To operate my invention I first confine the backrest C, at a sufficient height to free it from contact with the piece I desire to turn. I then confine the piece firmly in the lathe after which I rough turn and size down. I then lower the backrest C, and bring it firmly to bear upon the sized portion of the wood now turned. The upper portion of the index rest is then turned back to present the index ready for use, after which I have only to apply the molding tool and the work is completed.

What I claim as my invention and desire to secure by Letters Patent, is—

The hinged index rest as seen at M, for the purpose of roughing the material to be turned in connection with its subsequent use as shown at H, G, and n, n, arranged as shown, and for the purpose set forth.

DANIEL WHITE, JR.

Witnesses:
BENJA. ROBINSON,
DANIEL T. RICHARDSON.